(12) United States Patent
Paine

(10) Patent No.: US 8,141,421 B2
(45) Date of Patent: Mar. 27, 2012

(54) TANK MEASUREMENT SYSTEM USING MULTIPLE SENSOR ELEMENTS

(76) Inventor: Alan Paine, San Dimas, CA (US)

( * ) Notice: Subject to any disclaimer, the term of this patent is extended or adjusted under 35 U.S.C. 154(b) by 465 days.

(21) Appl. No.: 12/414,519

(22) Filed: Mar. 30, 2009

(65) Prior Publication Data

US 2010/0242595 A1    Sep. 30, 2010

(51) Int. Cl.
*G01F 23/30* (2006.01)
*G01F 23/76* (2006.01)

(52) U.S. Cl. .............. 73/309; 73/311; 73/322.5

(58) Field of Classification Search .......... 73/309, 73/311
See application file for complete search history.

(56) References Cited

U.S. PATENT DOCUMENTS

| | | | |
|---|---|---|---|
| 4,811,601 A | 3/1989 | Tolan | |
| 4,875,370 A | 10/1989 | Spitzer | |
| 4,969,356 A | 11/1990 | Hartstein | |
| 5,157,968 A * | 10/1992 | Zfira | 73/149 |
| 5,614,672 A * | 3/1997 | Legendre et al. | 73/437 |
| 5,744,716 A * | 4/1998 | Mimken et al. | 73/453 |
| 6,029,514 A * | 2/2000 | Adam et al. | 73/149 |
| 6,202,486 B1 | 3/2001 | Kemp | |
| 6,289,728 B1 | 9/2001 | Wilkins | |
| 6,675,643 B2 | 1/2004 | Weissmann | |
| 6,834,544 B2 | 12/2004 | Scott | |
| 2003/0221482 A1 | 12/2003 | Scott | |
| 2003/0233875 A1 | 12/2003 | Stehman et al. | |

* cited by examiner

*Primary Examiner* — Hezron E Williams
*Assistant Examiner* — Nathaniel Kolb
(74) *Attorney, Agent, or Firm* — Kirk A. Buhler; Buhler & Associates

(57) ABSTRACT

A tank or vessel volume measurement apparatus that includes multiple buoyancy elements. The buoyancy elements can be placed within a perforated tube to reduce any effects from turbulent flow within the tank. The multiple buoyancy load sensors are each made of different density or cross sections to cancel out any accumulation of contamination that may collect on the buoyancy elements placed within the fluid and to determine the density or specific gravity of the fluid within the tank. The buoyancy elements are attached to a load sensor or strain gauge that measures the weight or load from the buoyancy element. Temperature of other sensors can be placed on the buoyancy elements or within the tank to collect other readings or to adjust for temperature variations. The buoyancy elements can be fabricated in pieces and assembled on site or within the tank to accommodate taller tanks or height restrictions.

19 Claims, 3 Drawing Sheets

TANK MEASUREMENT SYSTEM USING MULTIPLE SENSOR ELEMENTS

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to measuring the level and specific gravity of fluid within a tank or vessel. More particularly, the present invention relates to using multiple different buoyancy load sensors placed within a tank or vessel that is filled with fluid. The multiple different buoyancy load sensors are each made of different density or cross sectional to cancel out any accumulation of contamination that may collect on the buoyancy elements placed within the fluid. The buoyancy elements can be fabricated in pieces that can be placed within the tank in pieces to make a longer sensing element. Different buoyancy characteristics allow identification of the specific gravity of the fluid based upon the different forces on the buoyancy elements.

2. Description of Related Art Including Information Disclosed Under 37 CFR 1.97 and 1.98:

Several products have been patented to measure the amount of fluid within a tank. For most of these patents, the tank is pressurized and may be filled with a fluid that may minimally collect of the load-sensing element placed within the tank. The accumulation of material on the element changes the reading on the amount of fluid within the tank.

Legendre et al. U.S. Pat. No. 5,641,672 discloses an apparatus for measuring the liquid contents of a tank where the tank is pressurized. This patent uses a single buoyancy element to measure the amount of fluid within a tank. The tank is also closed and sealed to maintain pressure within the tank. Any accumulation of debris on the buoyancy element will cause false reading. The buoyancy element is hung free from the sensor and movement of fluid within the tank can cause false readings. This patent further assumes the shape of the tank is linear and that the cross sectional area of the tank does not change based upon the level of fluid within the tank. The accuracy of this measurement is based upon a known specific gravity of the material within the tank. If the density changes then the accuracy of the amount of fluid within the tank is inaccurate.

Kemp U.S. Pat. No. 6,202,486 discloses an analog liquid level sensor. This sensor uses two thermocouples and a resistance wire to measure the amount of fluid within the tank. The sensors measure the difference in temperature between the two sensors to determine the amount of fluid within the tank. This patent requires that one sensor be placed above the fluid level and a second sensor placed below the fluid level, and may not accommodate where the fluid level goes above or below the two sensors. The sensors are placed on a single pole, and cannot be expanded to different lengths. Turbulent flow of fluid within the tank may further change the reading on the amount of fluid within the tank. This patent further assumes the shape of the tank is linear and that the cross sectional area of the tank does not change based upon the level of fluid within the tank.

Scott et al. U.S. Pat. No. 6,834,544, U.S. Patent Application 2003/0221482 and U.S. Patent Application 2004/0050157, discloses a liquid volume monitor for pressurized tanks. This patent uses a single suspended buoyancy element attached to a sensor with multiple temperature sensors to calculate the volume in the tank. The patent is more specifically written for hazardous or flammable materials where the density of the fluid changes based upon temperature. The tank is also closed and sealed to maintain pressure within the tank. Any accumulation of debris on the buoyancy element will cause false reading. The buoyancy element is hung free from the sensor and movement of fluid within the tank can cause false readings. This patent further assumes the shape of the tank is nearly cylindrical and that the cross sectional area of the tank does not change significantly based upon the level of fluid within the tank. The temperature sensor helps to minimize erroneous readings when the specific gravity of the fluid within the tank changes as a result of temperature changes. Contaminants within the tank can also cause changes in the specific gravity and the temperature sensors can't detect these differences.

What is needed is a tank volume measurement device that uses multiple cross-sectional or density elements that can cancel out any accumulation of debris or contamination of the buoyancy elements. The ideal device would further be able to accommodate tanks of varying cross-sections, and include at least one temperature sensor to account for fluid density changes based upon temperature or based upon ambient temperature sensor variations. The two separate sensors also are useful to determine changes in the specific gravity of the fluid. The proposed application satisfies these requirements.

BRIEF SUMMARY OF THE INVENTION

It is an object of the proposed tank measurement system to provide a fluid measurement device for measuring the amount of fluid within a tank or vessel. The measurement is performed with more than one buoyant element placed within the tank or vessel to cancel out errors.

Another object of the tank measurement system buoyant object with different buoyant properties eliminates any contamination or debris accumulation that may collect onto the buoyant elements. The buoyant elements can be the same or different cross sections, the same or different diameters and the same or different materials having different specific gravities. The use of different buoyant elements allows for the measurement of the specific gravity of the fluid as well as the level of the fluid within the tank.

Another object of the tank measurement system is to suspend the buoyant elements within the tank from strain gauges to allow the level of fluid within the tank to be measured with the strain gauges.

Another object of the tank measurement system is provide calculations to convert the fluid level readings from the tank into gallons, pounds, percentage capacity, liters, density, specific gravity or any other conversion that provides desired information regarding the fluid and fluid level within the tank.

Another object of the tank measurement system is to provide temperature information regarding the temperature internal and or external of the tank and use the temperature information to account for gauge, and or density variation based upon the temperature.

Another object of the tank measurement system is to provide a visual indicator regarding the amount of fluid within the tank the visual indicator may include numeric and or graphical display. In addition, the visual indicator may display minimum, maximum, error conditions and or history regarding the fluid with the tank.

Another object of the tank measurement system is to provide for buoyancy elements that can be installed in pieces to accommodate tanks of different heights, as well as allowing installation of the buoyancy elements in a building where height requirements may limit the length of a buoyancy element that can be placed within the tank as a single unit.

Another object of the tank measurement system is to use the multiple buoyancy elements with different buoyancy factors to dynamically determine the density, and or specific gravity or density of the fluid within the tank.

Still another object of the tank measurement system is to provide a baffle around the buoyancy elements to reduce or eliminate turbulent flow that may be present around the buoyancy element that can cause false or varying readings.

Various objects, features, aspects, and advantages of the present tank measurement system will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
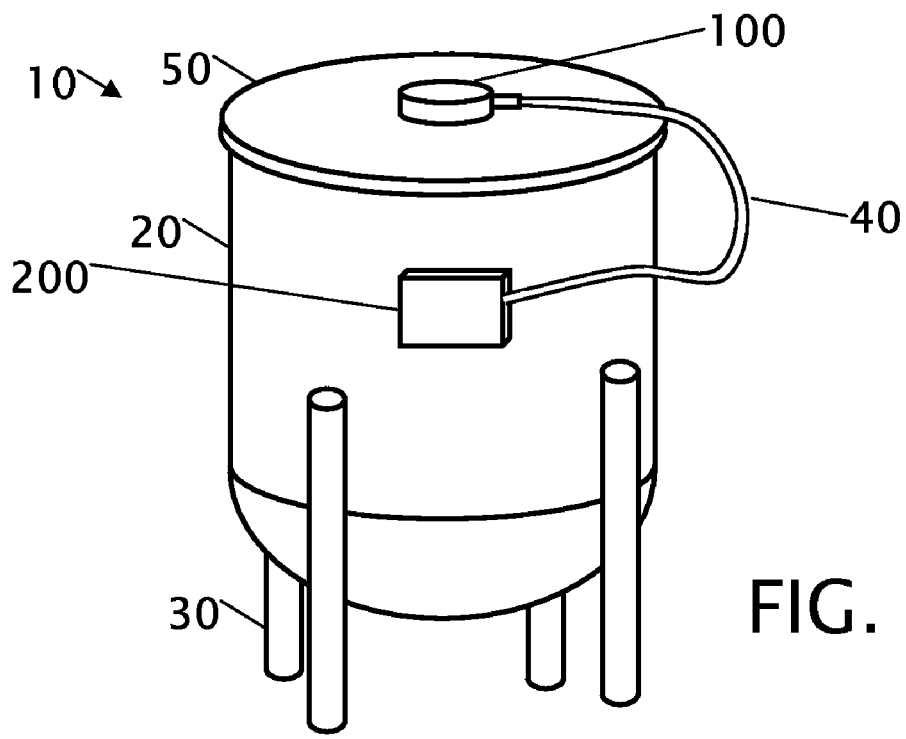
FIG. 1 is an isometric view showing the components of the liquid level measurement device shown from the exterior of a tank.
Figure 2:
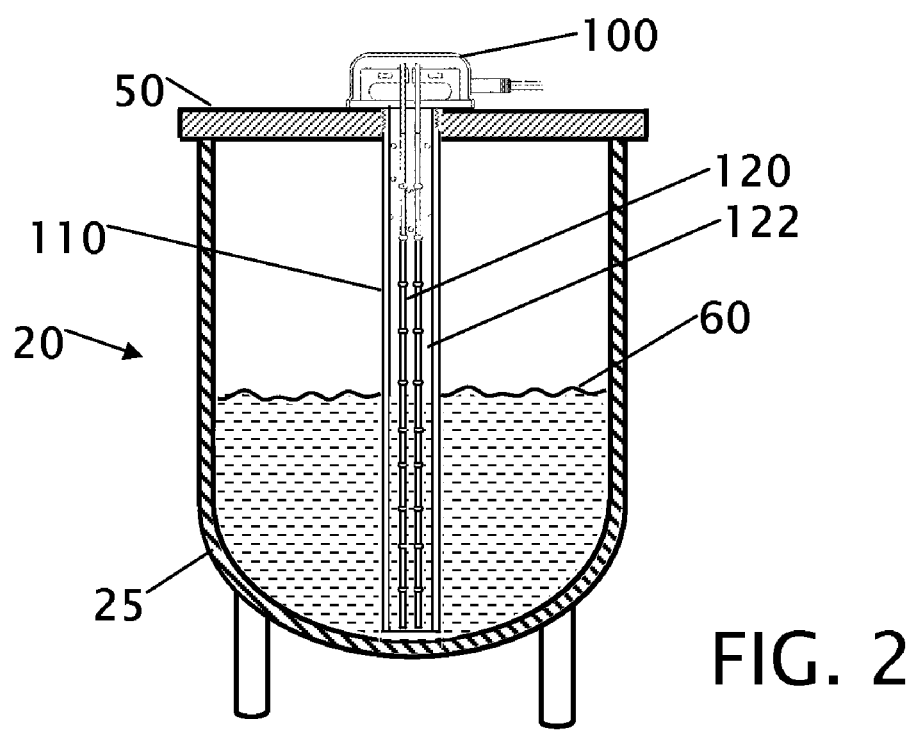
FIG. 2 is a cross sectional view of a tank with the liquid measurement device shown within the tank.

Referring to FIG. 1 there is shown an isometric view showing the components of the liquid level measurement device 10 shown from the exterior of a tank 20. The tank contains fluid that can be any type of fluid. The fluid can vary from water to gasoline to liquid nitrogen or other medium that is in a liquid state and the amount of fluid within the tank is measurable from a rising or sinking normal level as material is added and removed from within the tank 20. While fluids are the preferred material that the system will measure, other materials that provide some buoyancy that can be measured by the sensor rods can also be located within the tank 20. The tank 20 includes the sensors enclosed in a housing 100 that keeps the sensors in a controlled environment that reduces damage and or contamination to the sensor components as shown in FIG. 2. In the preferred embodiment, the sensors are located on the top or on the lid 50 of the tank or vessel, but it is also contemplated that the sensors can be located on the bottom of the tank and the sensor rods extend up into the tank. A connection consisting of wires, conduit 40 or other connection connects the sensor elements to a computation and or display unit 200. In the preferred embodiment a wired connection is made from the sensors to the amplifiers and or display unit. The amplifiers and or display unit can be connected directly to the sensor enclosure 100 or can be sent via a wireless connection such as infrared, FM or other wireless connection to the amplifiers and or the display unit. Legs 30 are shown supporting the tank, but the legs can be eliminated such that the tank is placed directly onto the ground or suspended from a ceiling attachment.

FIG. 2 is a cross sectional view of a tank with the liquid measurement device shown within the tank. From this figure, the tank 20 is shown with a non-uniform shaped tank. The tank includes a linear upper section and a curved, rounded, or spherical section 25 in the lower section. When calibrating the amount of fluid within the tank, the measurement calculations can be established based upon the geometric configuration of the tank. The display 200 can then show the level of fluid within the tank and or the quantity of fluid within the tank. While a tank 20 with an irregular lower section is provided it is contemplated that the fluid measurement system can work in cylindrical tanks, pyramid shaped tanks, rectangular tanks, or any other shape where the volume of the tank can be mathematically, empirically or process determined and calibrated into the fluid measurement system. This view shows a lid 50 installed on top of the tank. While the lid 50 is shown as a solid unit, the lid 50 can be as simple as a bridge member that spans across the sides of the tank or cantilevers from just one side of the tank 20. The lid 50 can also be as complicated as a sealed lid that keeps the fluid within the tank pressurized and or free from contaminants. The sensor enclosure 100 is shown attached to the lid, and located in the center of the tank 20. In the preferred embodiment the sensor sub assembly is located in the center of the tank 20, but it is contemplated that the sensor sub-assembly can be located off center. The off center configuration is particularly beneficial when the bottom of the tank 20 is sloped, and the sensor sub-assembly extends down into the deepest portion of the tank 20. The buoyancy rods 120 and 122 are shown extending from the sensor enclosure 100 to nearly the bottom of the tank.

The buoyancy rods are further shown inside a turbulence-reducing sleeve 110. This sleeve is essentially a round, square, rectangular or other hollow shaped member with a series of openings that allow fluid from the outside of the sleeve to fill the inside of the sleeve and reduce fluid movement from affecting the readings of the buoyancy rods. Fluid movement may be caused by filling, emptying or mixing of the fluid within the tank. The level of fluid 60 in the tank is measured with the buoyancy rods. The fluid within the tank reduces or floats the weight of the buoyancy rods. The greater the amount of fluid and or density of liquid within the tank the less the apparent weight of the buoyancy rod.

Two or more rods can be used to cancel out accumulation of debris that may occur on one rod. It is contemplated that one rod may be configured as a tube with a thin wall, while a second rod be configured as a solid member thereby creating different bouncy coefficients. Both rods would have the same outside diameter, but the buoyancy factors for each rod would be different because of the different cross sectional areas. Accumulation of debris on each rod would be the same since the outside surface are of the two rods are identical.

Figure 3:
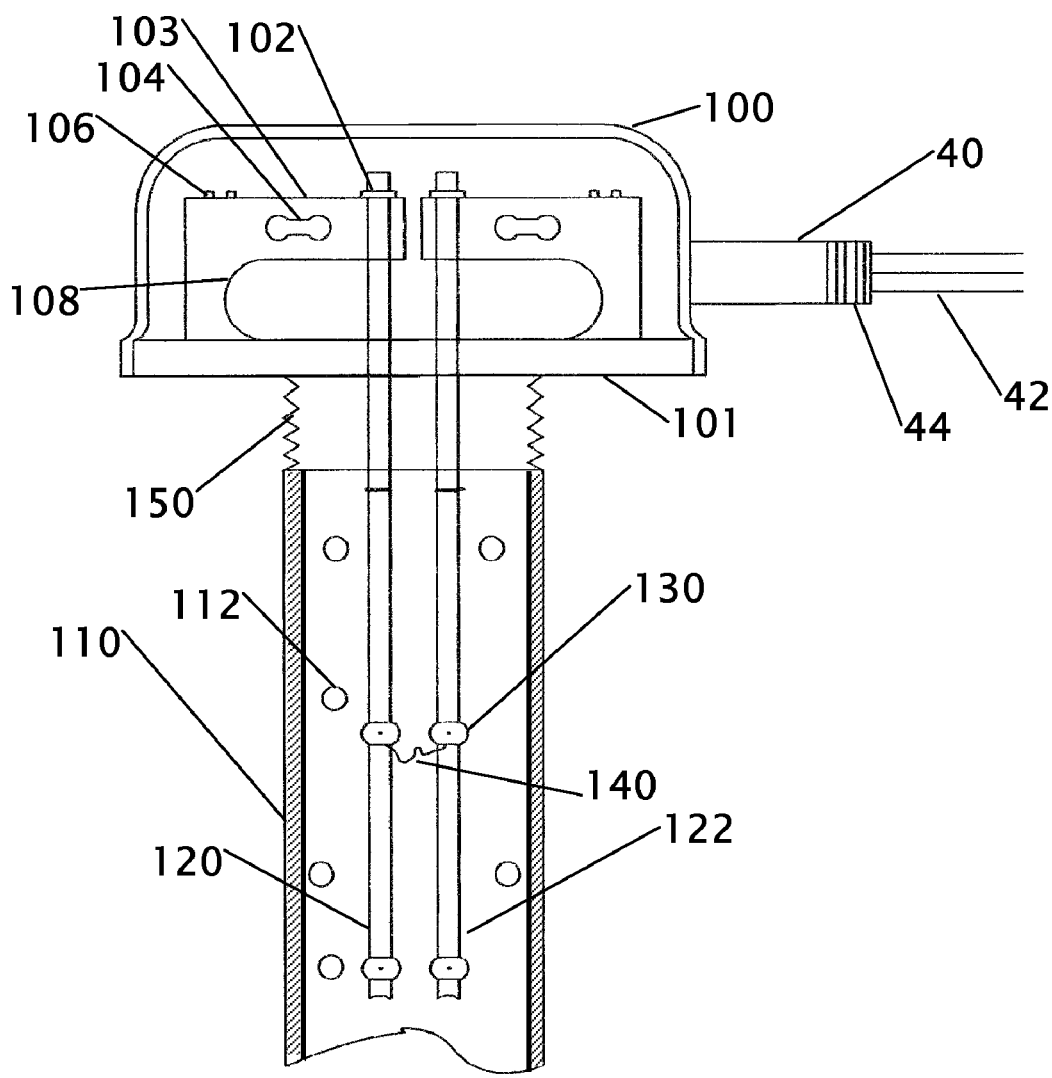
FIG. 3 is a detailed view of the liquid measurement device showing the components.

FIG. 3 is a detailed view of the liquid measurement device showing the components. This view provides additional information regarding one possible embodiment of the sensors and buoyancy rods. The sensors are enclosed within a housing 100 that protected then from contamination and or physical damage that may change the calibration factors for each buoyancy member. In the preferred embodiment, the strain gauge assembly is configured in a "C" type arrangement 108 where the buoyancy rods 120 and 122 extend the tip of each "C" member. The buoyancy members 120 and 122 attach to the end of the "C" at connection point 102. This connection point can by threaded, bonded or otherwise secured into the free end of the "C" member. A half or full wave sensor 103 is bonded on the "C" member above below or within a cut out 104.

The cut out 104 provides a stress concentration point that allows the sensor the measure stress or strain that is present in the "C" member. The connection from the sensor to connections outside of the sensor enclosure is provided with junction pads 106 that reduce stress that can occur on the sensitive wires attached to the strain gauges 103. In the preferred embodiment a full wave strain gauge is used for the measurement, a half wave strain gauge, resistance, force sensing resistor, capacitive or other measurement device can be used to provide similar measurement capability. The wire connections from the strain gauge 103 exit the housing 100 through fitting 40. This fitting is shown with the threaded coupling 44 that allow the wiring 42 from the sensors to connect to an amplifier or other signal processing.

Using two rods where both rods have the same cross section, but the specific gravity where a first rod 120 is half of the specific gravity of the second rod 122, if the fluid being displaced was water with a specific gravity of 1 then the loads measure from the strain gauges would be equally proportioned based upon the specific gravities. As the specific gravity of the fluid changes then the resulting measurements on the strain gauges change in a non-consistent manner.

In the embodiment shown, the amplification and display components are located external from the sensor sub-assembly, but the amplification, signal processing and display may be attached, integrated or a part of the sensor assembly. The bottom of the sensor housing 101 allows the sensor-sub assembly to be mounted directly on top of the tank. In the preferred embodiment, the top of the sensor sub-assembly is flat, but the base 101 may be any configuration that allows mounting of top of the tank. Buoyancy members 120 and 122 are shows extending down into the turbulent reducing tube 110. The turbulent reducing tube may have a threaded connection 150 that allows the turbulent reducing tube to be threaded into the top of lid of the tank or the sensor enclosure 101 bottom. While only two buoyancy members are shown it is contemplated that more than two elements can be used to provide improved accuracy and fluid density information.

The outer turbulent reducing tube 110 is configured with opening(s) 112 that allows fluid to enter and exit the turbulent reducing tube 110. While fluid can enter and exit the tube, the turbulent reducing tube 110 reduces abrupt changes or rapid fluid movement within the tank to provide more consistent or stable readings for the fluid level within the tank. The buoyancy members 120 and 122 can be configured in a single rod or tube or could be configured in pieces and joined 130 as shown. The purpose of the sections allow a long rod to be configured in a tank without requiring the ceiling of the building where the tank is installed to be high enough to allow insertion of a full length buoyancy element. The sectional buoyancy element is also ideal if the fluid tank is tall. In order to eliminate voltage potential that may be generated between the buoyancy elements 120 and 122, a shunting wire 140 is installed between the two buoyancy elements 120 and 122.

Figure 4:
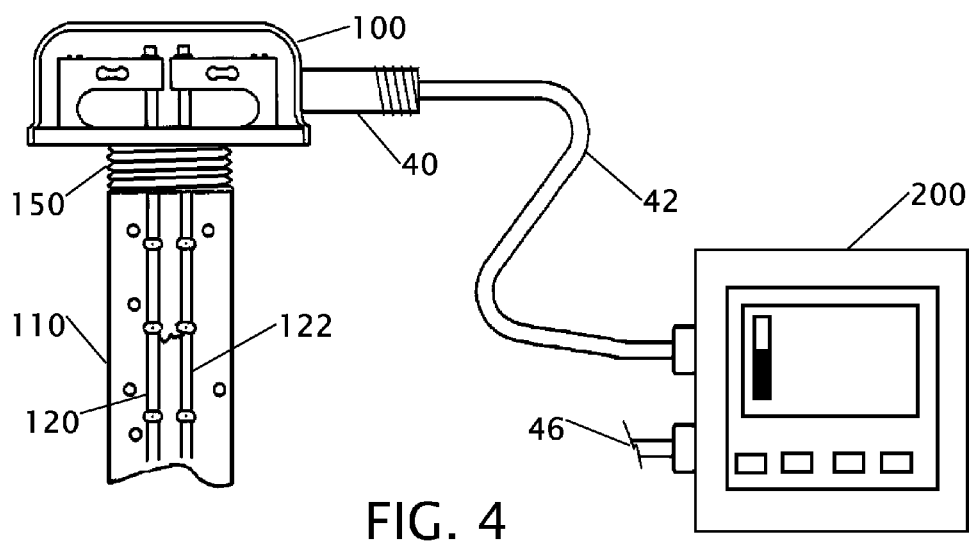
FIG. 4 shows the connection from the sensors to the display unit.

FIG. 4 shows the connection from the sensors to the display unit. The sensor enclosure 100 is shown with the cable conduit 40 exiting the display enclosure housing. The wired connection 42 is shown exiting the conduit and connecting into the display housing 200. A secondary wired connection 46 is showing exiting the display housing. This secondary connection allows amplified and or processed data to be sent for other data processing. The secondary signal can be amplified, voltage, current, analog, serial, parallel or digital output. This signal may be used by other systems within a company to control the entire process or to signal alarms when the level of fluid within the tank reached some pre-determined threshold. The turbulent reducing tube 110, the threaded turbulent reducing connection 150 and the buoyancy elements 120 and 122 are shown in this figure in one contemplated embodiment.

Figure 5:
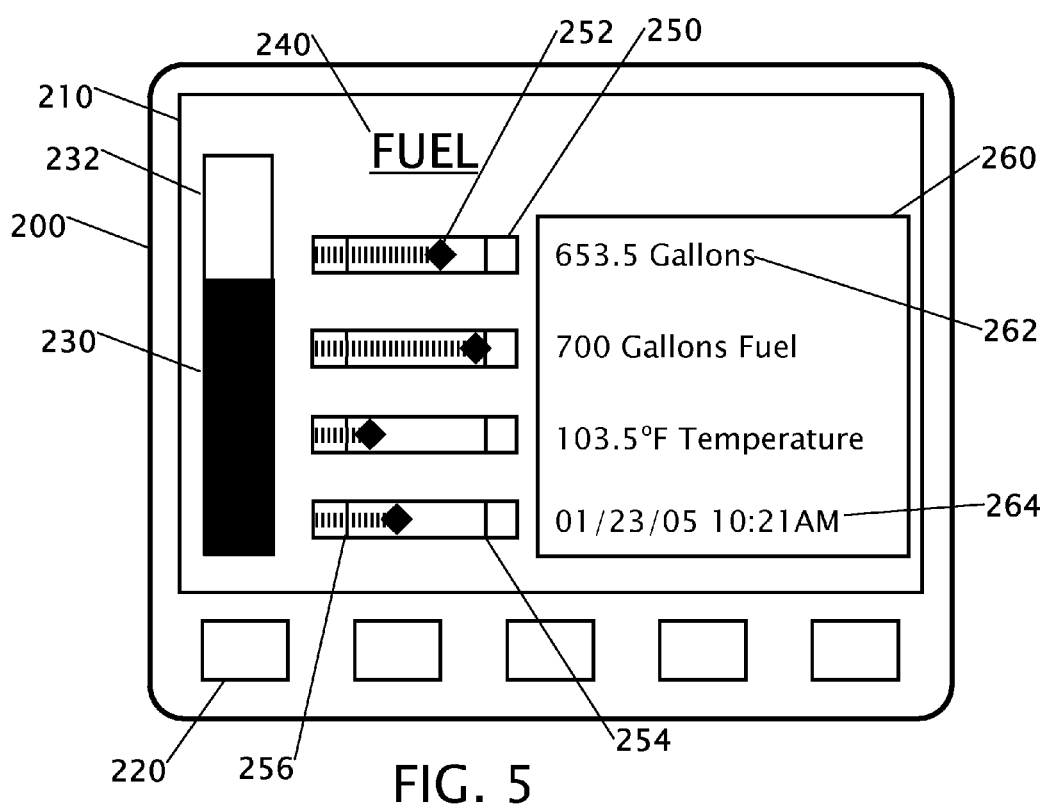
FIG. 5 shows one contemplated embodiment of the display unit.

FIG. 5 shows one contemplated embodiment of the display unit 200. The display module in this embodiment is shown in its own housing 200. The housing has a display module 210. The module is shown here, as a LCD display, but the display can be plasma, LED or other similar display system. The display is shown with buttons 220. While discrete buttons are shown, a touch screen may be used to allow selection of information and or information regarding minimum, maximum and or average information in addition to real time information regarding a particular parameter. A graphical display 230 showing a visual indicator regarding the amount of fluid within the tank. The amount of fluid 230 and the amount of air 232 is show visually giving an operator the ability to determine the amount of fluid within the tank without reading the numbers. The display may also show what is in the tank 240.

The identity of the fluid may be useful when a number of tanks are used in a factory where each tank contains a different fluid. An additional text and or numerical display area 260 can provide additional information regarding the contents of the tank. In this figure, the Gallons 262, Temperature, date and time 264 are shown. While the parameters listed are shown in the figure other parameters including but not limited to density, gallons, liters and specific gravity. A graphical display 250 can be shown for each item where a minimum 256 and maximum 254 markers can show the preferred range for each item. A bold marker 252 can also be used to provide higher visibility of the current position of each parameter, or the bold marker can be used to identify a minimum or maximum condition that may have occurred over a pre-determined period.

Thus, specific embodiments and applications for a fluid level sensing apparatus using multiple buoyancy sensors have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A liquid measurement device comprising:
   a first load cell attached to a top of a tank;
   at least a second load cell attached to said top of said tank as said first load cell;
   a first buoyancy displacement element attached to said first load cell and extending into said tank having an essentially constant cross section along a length of said first buoyancy displacement element;
   a second buoyancy displacement element attached to said second load cell extending into said tank having an essentially constant cross section along a length of said second buoyancy displacement element;
   wherein said first and said second displacement elements are the same cross section;
   wherein said first and said second displacement elements have different buoyancy factors, and a fluid volume, fluid level, fluid amount or tank fill percentage is determined from a signal from said first and said second load cells.

2. The liquid measurement device from claim 1 wherein said first load cell is selected from a group consisting of strain gauge, capacitive sensor, force sensing resistor and piezo sensor.

3. The liquid measurement device from claim 1 wherein said at least a second load cell is selected from a group consisting of strain gauge, capacitive sensor, force sensing resistor and piezo sensor.

4. The liquid measurement device from claim 1 includes more than two load cells and buoyancy displacement elements.

5. The liquid measurement device from claim 1 wherein said tank is a constant or a variable cross section.

6. The liquid measurement device from claim 1 wherein said displacement elements further include a turbulent reduction device that reduces or eliminates turbulent movement of fluid on at least one of said displacement elements.

7. The liquid measurement device from claim 1 wherein said fluid displacement elements are made from multiple segments joined with at least one coupling.

8. The liquid measurement device from claim 1 that further includes at least one temperature sensor that is placed internal to said tank, external to said tank or on said tank.

9. The liquid measurement device from claim 1 that further includes a numerical or graphical display means.

10. The liquid measurement device from claim 1 that further includes at least one shunt connection between each of said buoyancy displacement elements.

11. A liquid measurement device comprising:
at least one load cell attached to a top of a tank;
at least a first displacement element attached to said first load cell and extending into said tank within an anti-turbulent tube;
that further includes at least a second load cell attached to at least a second displacement element placed in said anti-turbulent tube or at least a second anti-turbulent tube;
said at least a first displacement element has an essentially constant cross section along a length of said first displacement element;
said at least a second displacement element has an essentially constant cross section along a length of said second displacement element;
wherein said first and said second displacement elements are the same cross section;
wherein load cell provides information that is used to determine a level of fluid within said tank.

12. The liquid measurement device from claim 11 wherein said at least one load cell is selected from a group consisting of strain gauge, capacitive sensor, force sensing resistor and piezo sensor.

13. The liquid measurement device from claim 11 wherein said tank is a constant or a variable cross section.

14. The liquid measurement device from claim 11 wherein said fluid displacement element(s) are made from multiple segments.

15. The liquid measurement device from claim 11 that further includes at least one temperature sensor that is placed internal to said tank, external to said tank or on said tank.

16. The liquid measurement device from claim 11 that further includes a display apparatus to provide information regarding said fluid level within said tank.

17. The liquid measurement device from claim 11 wherein said anti-turbulent tube contains at least one opening.

18. The liquid measurement device from claim 11 wherein said information from said at least a first load cell is processed and sent for distal processing.

19. The liquid measurement device from claim 11 that is used within a pressurized tank.

\* \* \* \* \*